US009027046B2

(12) United States Patent
Guo et al.

(10) Patent No.: US 9,027,046 B2
(45) Date of Patent: May 5, 2015

(54) METHOD AND APPARATUS FOR PEER-TO-PEER STREAMING OF LAYERED CONTENT

(75) Inventors: Yang Guo, Princeton Junction, NJ (US); Hao Hu, Brooklyn, NY (US); Yong Liu, Brooklyn, NY (US)

(73) Assignee: Thomson Licensing, Issy les moulineaux (FR)

( * ) Notice: Subject to any disclaimer, the term of this patent is extended or adjusted under 35 U.S.C. 154(b) by 375 days.

(21) Appl. No.: 13/381,508

(22) PCT Filed: Jun. 30, 2009

(86) PCT No.: PCT/US2009/003899
§ 371 (c)(1),
(2), (4) Date: Dec. 29, 2011

(87) PCT Pub. No.: WO2011/002430
PCT Pub. Date: Jan. 6, 2011

(65) Prior Publication Data
US 2012/0110609 A1 May 3, 2012

(51) Int. Cl.
*H04H 60/32* (2008.01)
*H04N 7/173* (2011.01)
*G06F 15/16* (2006.01)
*H04L 29/08* (2006.01)
(Continued)

(52) U.S. Cl.
CPC ...... *H04L 67/104* (2013.01); *H04N 21/234327* (2013.01); *H04N 21/4788* (2013.01); *H04N 21/632* (2013.01); *H04L 67/1008* (2013.01); *H04L 67/1029* (2013.01); *H04L 67/1061* (2013.01); *H04L 67/32* (2013.01); *H04L 67/1002* (2013.01); *H04L 67/1078* (2013.01)

(58) Field of Classification Search
USPC .............. 725/14, 95, 114; 709/227–237
See application file for complete search history.

(56) References Cited

U.S. PATENT DOCUMENTS

2004/0221032 A1* 11/2004 Bernstein et al. .............. 709/224
2006/0053209 A1*  3/2006 Li .................................. 709/217
(Continued)

FOREIGN PATENT DOCUMENTS

CN        101282231      10/2008
FR          2913844       9/2008
WO     WO2008043092       4/2008

OTHER PUBLICATIONS

Sung et al., "Enabling Contribution Awareness in an Overlay Broadcasting System", IEEE Transactions on Multimedia, vol. 9, No. 8, Dec. 1, 2007, pp. 1605-1620.
(Continued)

*Primary Examiner* — Gigi L Dubasky
(74) *Attorney, Agent, or Firm* — Robert D. Shedd; Ivonete Markman (57) ABSTRACT

A method and apparatus are described including receiving buffer maps of neighbor peers, measuring serving rates from the neighbor peers, measuring serving rates to the neighbor peers, requesting a unit of data from one of the neighbor peers responsive to information in the buffer maps of the neighbor peers at a rate responsive to the serving rate from the one of the neighbor peers, receiving incoming requests for units of data, sorting the incoming requests into a plurality of queues, selecting one of the incoming requests to serve responsive to the serving rates to the neighbor peers corresponding to the incoming request, updating the queues and selecting a new neighbor peer.

12 Claims, 9 Drawing Sheets (51) Int. Cl.
*H04N 21/2343* (2011.01)
*H04N 21/4788* (2011.01)
*H04N 21/63* (2011.01)

(56) References Cited

U.S. PATENT DOCUMENTS

| | | | |
|---|---|---|---|
| 2006/0190615 | A1 | 8/2006 | Panwar et al. |
| 2007/0204313 | A1 | 8/2007 | McEnroe et al. |
| 2008/0140853 | A1 | 6/2008 | Harrison |
| 2009/0037968 | A1* | 2/2009 | Liu et al. ............ 725/114 |
| 2010/0064049 | A1* | 3/2010 | Magharei et al. ...... 709/229 |
| 2010/0146569 | A1* | 6/2010 | Janardhan et al. ...... 725/98 |

OTHER PUBLICATIONS

Zhang et al., "Large-Scale Media Streaming Over Peer-to-Peer Networks through Global Internet", ACM Multimedia, [Online], Nov. 2005, pp. 21-28.
Lee et al., "A Scalable Video Codec Design for Streaming Over Distributed Peer-to-Peer", IEEE Explore, 2002 IEEE, pp. 539-543.
Ozbilgin et al. Scalable Video Streaming in Wireless Peer-to-eer Networks, IEEE Explore, 2008 IEEE.
Mushtao et al. "Smooth Video Delivery for SVC Based Media Streaming over P2P Networks", IEEE CCNC 2008 Proceedings, pp. 447-451.
Search Report Dated Jun. 25, 2010.
Abboud et al., "Quality Adaptive Peer-to-Peer Streaming Using Scalable Video Coding," Wired-Wireless Multimedia Networks and Services Management, Heidelberg, Berlin, Oct. 26, 2009, pp. 41-54.
Biskupski et al., "Improving Throughput and Node Proximity of P2P Live Video Streaming Through Overlay Adaptation," 9th IEEE International Symposium on Multimedia (ISM 2007), Taichung, Taiwan, Dec. 10-12, 2007, IEEE published in 2008, pp. 245-252.
Chu et al, "A Case for Taxation in Peer-to-Peer Streaming Broadcast," in ACM SIGCOMM workshop on Practice and Theory of Incentives in Networked Systems, Aug. 30-Sep. 3, 2004, Portland, Oregon, USA, 8 pages.
Habib et al., "Service Differentiated Peer Selection: An Incentive Mechanism for Peer-to-Peer Media Streaming," IEEE Transactions on Multimedia, vol. 8, No. 3, Jun. 2006, pp. 610-621.
Liu et al., "Using Layered Video to Provide Incentives in P2P Live Streaming," in SIGCOMM 2007 Workshop on peer-to-peer streaming and IP-TV, Aug. 31, 2007, Kyoto, Japan, 2007 ACM, 6 pages.
Liu et al., "LayerP2P: Using Layered Video Chunks in P2P Live Streaming," IEEE Transactions on Multimedia, vol. 11, No. 7, Nov. 2009, pp. 1340-1352.
Liu et al., "Substream Trading Towards an Open P2P Live Streaming System," in ICNP (2008), pp. 94-103.
Magharei et al., "Incorporating Contribution-Awareness Into Mesh-Based Peer-to-Peer Streaming Systems," in Technical report, University of Oregon (2007), published online Jul. 2, 2010, Springer Science+Business Media, LLC 2010, 20 pages.
McCanne et al., "Receiver-Driven Layered Multicast," Computer Communication Review, ACM, New York, NY, Oct. 1, 1996, pp. 117-130.
Liu et al., "P2P Video Live Streaming with MDC: Providing Incentives for Redistribution," 2007 International Conference on Multimedia & Expo, Beijing, China, Jul. 2-5, 2007, IEEE 2007, pp. 48-51.
Rejaie et al., "PALS: Peer-to-Peer Adaptive Layered Streaming," Proceedings of the 13th International Workshop on Network and Operating Systems Support for Digital Audio and Video, Monterey, CA, Jun. 1-3, 2003, 10 pages.
Shi et al., "A Novel Incentive Mechanism Improving Peer-to-Peer On-demand Streaming," 2006 IEEE, Beijing, China, pp. 91-95.
Zhao et al., "LION: Layered Overlay Multicast with Network Coding," IEEE Transactions on Multimedia, vol. 8, No. 5, Oct. 2006, pp. 1021-1032.
Zhu et al., "Video Multicast Over Wireless Mesh Networks with Scalable Video Coding (SVC)," Visual Communications and Image Processing 2008, San Jose, CA, USA, Jan. 29, 2008, Proceedings of SPIE, The International Society for Optical Engineering, vol. 6822, Jan. 2008, 8 pages.

* cited by examiner

METHOD AND APPARATUS FOR PEER-TO-PEER STREAMING OF LAYERED CONTENT

This application claims the benefit, under 35 U.S.C. §365 of International Application PCT/US2009/003899, filed Jun. 30, 2009, which was published in accordance with PCT Article 21(2) on Jan. 6, 2011 in English.

FIELD OF THE INVENTION

The present invention is related to streaming peer-to-peer (P2P) networks and scalable video coding used therein. One use of P2P streaming is for internet protocol television (IPTV).

BACKGROUND OF THE INVENTION

In multicast/broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

IPTV (Internet Protocol Television) is a system where a digital television service is delivered using Internet Protocol over a network infrastructure. In general, IPTV is television content that, instead of being delivered through traditional broadcast and cable formats (including satellite), is received by the viewer through the technologies employed in computer networks, all of which employ Internet Protocol and related standards such as simple network management protocol (SNMP).

Video is used herein as an example of content. Content includes but is not limited to audio, video and multimedia. Further, a peer-to-peer node includes but is not limited to stations, client devices, mobile devices, mobile terminals, laptops, computers, dual mode smart phones, personal digital assistants (PDAs) etc. That is, a P2P device is any device that can communicate digitally over a network. Herein, the exemplary network is a wired network but a P2P network may also be a wireless network.

The majority of existing P2P live streaming systems ignore fairness and focus solely on maximizing the common welfare. For instance, one prior art study described how to fully utilize available upload bandwidth so as to maximize the video rate that can be streamed.

A SVC stream is employed to improve the common welfare further in the face of peer churn and fluctuation of available bandwidth. The fairness issue has been investigated in other prior studies. One such prior art study proposed a service differentiated peer selection mechanism for P2P media streaming systems. Higher contribution peers were offered more flexibility and choice in selecting peers with which to associate and, thus, achieved better viewing quality. Another prior art study proposed a sub-stream trading technique which allowed peers contributing more sub-streams to reciprocally receive more sub-streams, thus, enhancing their viewing quality.

Typically, fairness (individual welfare) is diametrically opposed to the notion of common welfare. How to strike an appropriate balance between the two is challenging. To make things worse, being "fair" in P2P live streaming system is not easy. Unlike P2P based file sharing systems such as BitTorrent, which introduces so called "tit-for-tat" technique to encourage peer contribution, a mechanism similar to "tit-for-tat" does not work well in P2P live streaming. This is mainly due to the real time requirement imposed by a streaming service, in combination with the desire to service high quality video to a large number of users.

Cost-based schemes have also been investigated in the prior art. In one such prior art study, video was coded into descriptions using multiple descriptions coding (MDC). The number of received descriptions determined the perceived video quality. Peers form trees and one description is distributed over one tree. Peers participate in a tree to retrieve (receive) certain descriptions. The number of trees joined is dynamically adjusted to reflect the entitled video quality determined by a cost policy.

SUMMARY OF THE INVENTION

Recent advances in scalable video coding (SVC) makes it possible for users to receive the same video with different qualities. To adopt SVC in P2P streaming, two key design questions need to be answered: 1) layer subscription: how many coded layers each peer (node) should receive; and 2) layer scheduling: how to deliver to the peers the coded layers to which the peers subscribed. From a system point of view, the most efficient solution is to maximize the aggregate video quality for all peers, i.e, the common welfare. From the point of view of an individual peer, the solution should be fair. Fairness in P2P streaming should take into account peers' contributions to make the solution incentive-compatible.

A utility maximization model is used herein to understand the interplay between efficiency, fairness, and incentive in layered P2P streaming. A cost mechanism is shown to be able to strike an appropriate balance between common welfare and individual peer's welfare. Practical cost-based streaming designs, including an overlay maintenance strategy and inter-layer scheduling policy, are developed.

A method and apparatus are described including receiving buffer maps of neighbor peers, measuring serving rates from the neighbor peers, measuring serving rates to the neighbor peers, requesting a unit of data from one of the neighbor peers responsive to information in the buffer maps of the neighbor peers at a rate responsive to the serving rate from the one of the neighbor peers, receiving incoming requests for units of data, sorting the incoming requests into a plurality of queues, selecting one of the incoming requests to serve responsive to the serving rates to the neighbor peers corresponding to the incoming request, updating the queues and selecting a new neighbor peer.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

P2P live video streaming has recently emerged as a cost-efficient IPTV solution using the Internet. The success of the P2P paradigm for IPTV hinges on the underlying principle that participants contribute their resources (in terms of bandwidth, storage space, or computational power) while enjoying the service. Most existing P2P streaming systems assume the cooperation of peers and deliver the same video quality to all peers. Recent advances in scalable video coding (SVC) makes it possible for users to receive the same video with different qualities. SVC encodes video into correlated layers. The base layer can be independently decoded, while higher (upper) layers are decodable only if the lower layers have been properly decoded. The video quality perceived by a user increases as the number of decoded layers increases.

To adopt SVC into P2P streaming, two key design questions need to be answered: 1) layer subscription: how many coded layers each peer should receive; and 2) layer scheduling: how to deliver to the peers the coded layers to which the peers subscribed. From the system point of view, the most efficient solution is to maximize the aggregate video quality perceived by all peers, i.e, to optimize the common welfare. From point of view of an individual peer, the solution should be fair. However, in P2P streaming, due to the dual server-consumer role of individual peers, the notion of fairness is much more subtle than in traditional client-server systems, where clients are only considered to be resource consumers. A solution allocating the same video quality to all peers regardless of their contributions would not be considered fair and, therefore, would not provide incentives for peers to contribute their resources. A good layered P2P streaming solution has to strike an appropriate balance between efficiency, fairness and incentive.

Analytical models and practical streaming algorithms are developed herein to understand and control the interplay between efficiency, fairness and incentive in layered P2P streaming. Specifically, network-coding based utility maximization models are developed to obtain the most efficient layered streaming solution. The choice of peer utility function reflects the targeted fairness among peers when the peers are considered only as video consumers. To incorporate contribution-awareness, cost is adopted as a peer-incentive mechanism and the utility maximization models are augmented to make the solution incentive-compatible.

Figure 1:
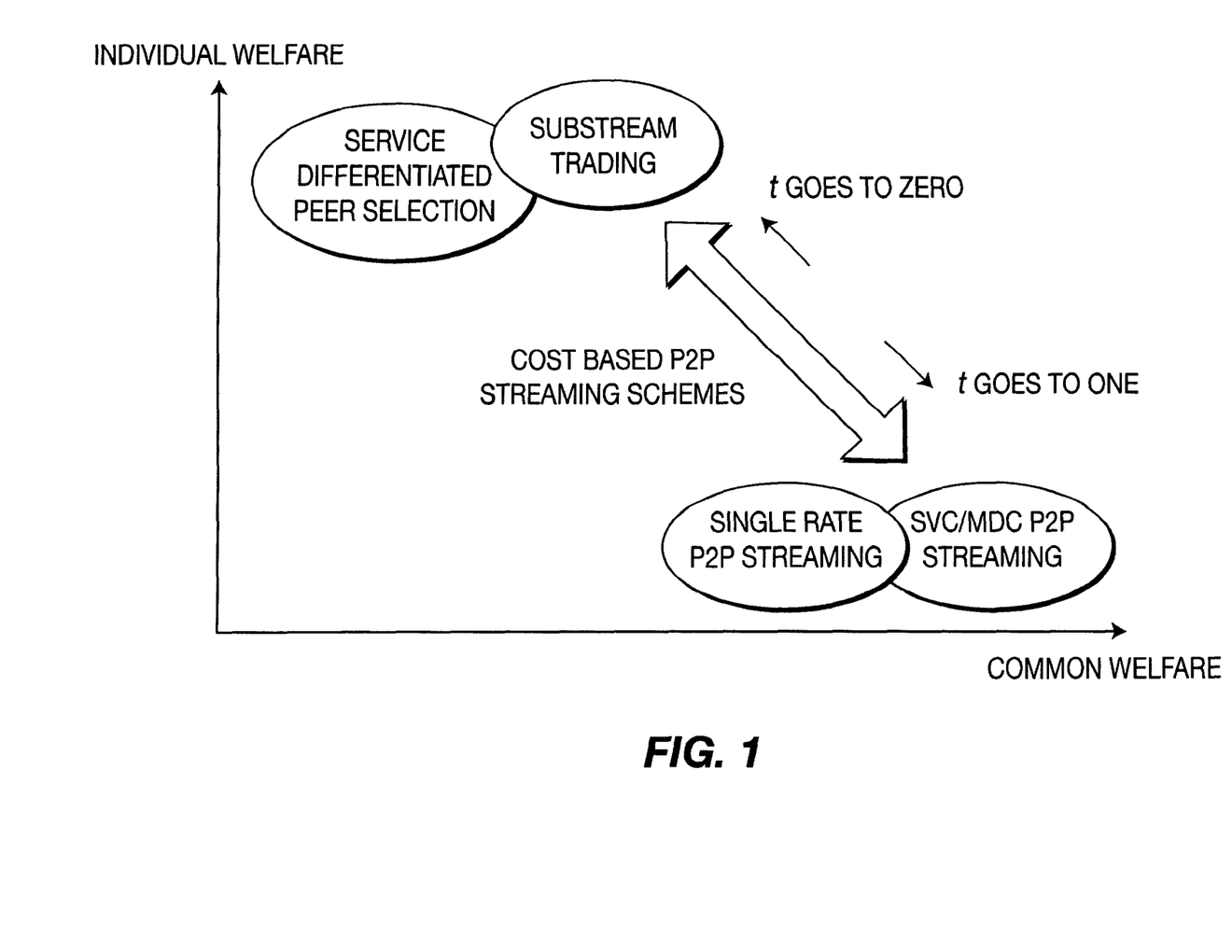
FIG. 1 is a graph of common welfare vs. individual welfare (fairness).

A cost-based incentive mechanism offers a flexible framework that allows the tradeoff between user's personal fairness (individual welfare) and system wide common welfare. As can be seen from FIG. 1 individual welfare and common welfare are at opposite ends of the spectrum. Let $u_d$ be the contributed upload bandwidth of user d and $r_d$ the received video rate of user d. The received video rate of user d is $$r_d = (1-t)u_d + \frac{1}{N}\sum_{i=1}^{N} tu_i,$$

where t is cost factor ($0 \leq t < 1$), and N is total number of peers in the system. The entitled video rate is made up of two parts, a fraction of its own contribution (1/N), plus a fair share from the pool of bandwidth. The cost factor t is a configurable system parameter, and serves as the knob that adjusts the balance between individual peer's welfare and common welfare. As the value of t approaches zero, the received video rate approaches the contributed rate, mimicking "tit-for-tat" strategy. As the value of t approaches one, the received video rate is the same for all peers, thus achieves the optimum from the perspective of the common welfare.

Utility maximization models are developed herein to study the interplay between efficiency, fairness and incentive in layered P2P streaming. The models enable the numerical investigation of the impact of peering strategies and data chunk scheduling polices on the fundamental trade-offs between efficiency, fairness and incentive. In addition, a cost mechanism is introduced to adjust the balance between the common welfare and individual peer welfare. Practical cost-based streaming designs, including an overlay maintenance strategy and a data chunk scheduling policy are developed.

First, analytical models are developed to study the interplay between the efficiency, fairness and incentive in layered P2P streaming. Then, a protocol is designed and the various agents (modules, components) behavior is described. As used herein, behavior can be thought of as a method or process. Each component (module) has a process or method which describes its behavior.

When peers are cooperative, they are willing to contribute their upload bandwidth without any incentive. The design objective of the system is to maximize the aggregate video quality for all peers. With layered coding, the perceived video quality for a peer is an increasing function of the number of video layers received. Peak Signal-to-Noise Ratio (PSNR) is the standard objective metric to evaluate the quality of a compressed video and thus can be adopted as the utility function in layered video streaming. PSNR of a video coded at rate $r_c$ can be approximated by a logarithmic function $\beta \log(r_c)$, where $\beta$ is a constant related to the characteristic of video clips. This approximation is also valid in the SVC case. Let $r_d$ be the total rate of received video layers at peer d, $1 \leq d \leq N$.

If the aggregate uploading capacity of the server and all peers is U, the aggregate receiving rate for all peers is naturally bounded by $$\sum_{d=1}^{N} r_d \leq U.$$

Since log(.) is a concave function, the aggregate utility can be maximized when all peers receive video at the same rate $r_d = U/N$. For single-layer video streaming, if the peers are fully connected, a two-hop relay streaming can achieve this optimal rate. The solution for layered video streaming naturally follows if all peers subscribe to the same number of video layers allowed by the rate U/N and deliver each layer to all peers using the two-hop relay scheme. However, it is unrealistic to have fully connected mesh in a large-scale streaming system. For an arbitrary streaming topology, the utility maximization in layered streaming deserves more study.

Consider a SVC system where the source server encodes a video stream into L layers with nested dependency. Layer l can be decoded if and only if all the layers below layer l are received and properly decoded. A peer can subscribe up to k, k≤L, layers.

The server multicasts each layer to all peers that subscribe to it. Consequently, there are L simultaneous multicast sessions, one for each layer, in a P2P overlay network. The server and peers are allowed to apply network coding to video blocks to reach the maximum multicast rate allowed by peer upload capacities and the peering topology. Network coding has been shown to achieve the maximum multicast rate for a single multicast session in general network topology. For multiple multicast sessions, inter-session network coding might be needed to achieve maximal multicast rates. However, the complexity of inter-session network coding is generally too high to be justified by its additional performance gain on top of intra-session network coding. Consequently, the focus herein is on intra-session network coding. The server and peers apply network coding to video blocks in the same layer.

Let a directed graph $\mathcal{G}=(V, E)$ be the overlay topology of the P2P streaming system under study. Let S be the video source server, and R=V\S be the set of peers interested in receiving the video. Let $\vec{x}_d(x_d^1, x_d^2, \ldots, x_d^L)$ represents the set of layers received by peer d: $x_d^l$ equals 1 if peer d receives layer l, 0 otherwise. The video rate for layer l is $r^l$. To model network coding, $g_{ij}^{l,d}$ is introduced to denote the information flow of layer l on link <i,j> (belonging to E) to destination peer d. For a given peer d and layer l, $\{g_{ij}^{l,d}, <i,j> \in E\}$ forms a legitimate flow with rate $r^l$ from the source S to peer d and satisfies the flow conservation on all nodes in the network. Denote by $f_{ij}^l \triangleq \max_d g_{ij}^{l,d}$ the maximum information flow on <i,j> for all receivers of layer l. According to intra-session network coding theory, the multicast session for layer l is supportable if and only if a bandwidth of $f_{ij}^l$ is allocated to layer l on link <i,j>.

The optimal P2P streaming solution is sought in order to maximize the aggregate video experience for all peers. Given the set of received layers $\vec{x}_d$ on destination peer d, its video experience can be quantized using a utility function $F_d(\vec{x}_d)$. The optimal streaming solution can be found by solving the utility maximization problem outlined in P1.

P1: Utility Maximization
Variables:
$g_{ij}^{l,d}$ continuous non-negative variable
$f_{ij}^l$ continuous non-negative variable
$x_d^l$ binary variable Objective:

$$\max \sum_{d \in R} F_d(\vec{x}_d) \quad (1)$$

Constraints $$\sum_{\langle i,j \rangle \in V} g_{ij}^{l,d} - \sum_{\langle j,i \rangle \in V} g_{ji}^{l,d} = \begin{cases} x_d^l r^l, & i=S \\ -x_d^l r^l, & i=d \\ 0, & \text{otherwise} \end{cases} \quad \forall d \in R, \forall l \leq L \quad (2a)$$

$$g_{ij}^{l,d} \leq f_{ij}^l, \forall l \leq L, \forall d \in R, \forall \langle i,j \rangle \in E \quad (2b)$$

$$x_d^{l+1} \leq x_d^l, \forall l \leq L, d \in R \quad (2c)$$

$$\sum_l \sum_{\langle i,j \rangle \in E} f_{ij}^l \leq U_i, \forall i \in V \quad (2d)$$

Constraint (2a) guarantees flow conservation for the information flows of each peer. The benefits brought by utilizing network coding are embedded in constraint (2b). In SVC bit streams, each higher (upper) layer depends on the lower layers, and so peer d may request l+1 layer only if it has received all lower layers, say, 1, 2, . . . , l. Constraint (2c) captures this dependency among layers. Finally, (2d) is the uplink capacity constraint on all peers and the server.

By adopting the PSNR-Rate model, the utility function can be defined as $$F_d(\vec{x}_d) = \beta \log \left( \sum_{l=1}^{L} x_d^l T^l \right) \quad (3)$$

By substituting Eq. (3) into Eq. (1), the objective function turns into $$\max \prod_{d \in R} \sum_{l=1}^{L} x_d^l r^l \quad (4)$$

Even though the formulation is not complex, it is hard to solve. The objective function is non-linear; it contains binary variables; and it is also not separable. Thus approximation models that are much easier to solve are considered.

Linear approximation is introduced in order to relax the original problem. The logarithm utility function is first approximated by a weighted-sum function. Because of the layer dependency in the SVC bit stream, peers have to retrieve lower layers first. This naturally leads to a weighted-layer model. Weights are assigned to layers in a decreasing fashion: lower layers are assigned with weights much larger than higher (upper) layers, i.e., $w^l \gg w^{l+1}$. The video experience of a peer is characterized by the summation of the weights of all the received layers: $F_d(\vec{x}_d) = \sum_{l=1}^{L} x_d^l w^l$. The marginal gain for receiving a lower layer outweighs that of receiving higher (upper) layers. As a result, the optimal solution with the weighted-sum utility function will easily satisfy the constraint (2c). If the binary variables $x_d^l$ in P1 are further relaxed to be continuous variables within the interval [0,1], the optimal solution will naturally have the property that $x_d^l > 0$ only if $x_d^k = 1$, for all k<l. Formally, the original non-linear mixed integer programming problem is relaxed into the following linear programming problem outlined in P2:

P2: Linear Approximation
Variables:
$g_{ij}^{l,d}$ continuous non-negative variable
$f_{ij}^{l}$ continuous non-negative variable
$x_d^l \in [0, 1]$, continuous variable
Objective:

$$\max \sum_{d \in R} \sum_{l=1}^{L} x_d^l w^l \quad (5)$$

Constraints: (2a), (2b), (2d)

In classical resource allocation problems, utility maximization achieves different notions of fairness between competing resource consumers. In P2P video streaming, each peer plays the dual role of server and consumer. A peer's server role is ignored in contribution-oblivious utility maximization. The obtained optimal solution can also be interpreted as fairness among peers without considering their contributions. Within the fairness contest, it is straightforward to show that the solution of the original utility maximization problem P1 achieves the "proportional fairness" among peers under the given overlay topology G and node upload capacity profile U. The solution of the linear programming problem P2 gives weighted priority for peers to receive lower layer video. Another commonly employed fairness criterion is the "max-min fairness". In the context of layered video streaming, max-min fairness means that a unit of upload bandwidth should not be utilized to disseminate video layer k to a peer if it can be utilized to disseminate a layer l<k to another peer missing layer l. Similar to the max-min network flow allocation, the max-min fairness in layered streaming can be achieved using the following "onion-peeling" solution.

1. Set iteration counter m=1; Initialize network topology G(1)=G, receiving peers R(1)=R, and node upload capacity profile U(1)=U; Initialize the layer counter to l=1 and the receiving vector $x_d^l$=0, for all d, l.

2. For a given P2P streaming system {G(m), R(m), U(m)}, find the maximum supportable single-layer multicast rate r*(m) by solving the linear programming problem P3 (G(m), R(m), U(m)) as defined below, record the consumed upload bandwidth {A*_d(m), d∈R(m)} in this iteration according to output (7) as defined in P3.

w(m)=0; while (w(m)+r¹<r*(m))

{$x^{dl}$=1, for all d∈R(m);w(m)+=$r^l$;l++;}

3. If(w(m)==0) exit;
4. Update the remaining peer upload bandwidth $U_d(m+1)=U_d(m)-A*_d(m)w(m)/r*(m)$;

5. Update topology G(m) of the streaming system and the receiver set R(m) in the following way:
For any peer d with zero remaining upload bandwidth, U_d(m+1)==0, remove from G(m) all egress links of d, <d, .>;
Remove a peer from G(m) and R(m) if it has no ingress link <., d>.

6. Set m=m+1, go back to step 2.

Essentially, the problem is solved iteratively. At each iteration, the maximum multicast rate to all active receivers (Step 2) is determined. The multicast rate is utilized to send the same number of layers, starting from the lowest layer, to all receivers (Step 3 and 4). Peer upload bandwidth is updated (Step 5). A peer is removed from the receiver set and streaming system if all its neighbors have no upload bandwidth (Step 6). The remaining peers can receive additional layers in the next iteration (Step 7). In such an approach, the receiver set for a higher (upper) layer is always guaranteed to be a subset of the receiver set of a lower layer, and at each layer, the receiver set is maximized.

At each iteration, it is only necessary to solve a linear programming problem P3, which has fewer variables than in P1 and P2. P3 is evaluated in the following.

P3 $\mathcal{G}$, R, U)
Variables:
r supportable multicast rate
$g_{ij}^d$ information flow for peer d on link <i, j>
$f_{ij}$ physical flow on link <i, j>
$A_i$ consumed upload bandwidth on peer i
Objective:

$$\max r$$

Constraints:

$$\sum_{\langle i,j \rangle \in V} g_{ij}^d - \sum_{\langle j,i \rangle \in V} g_{ji}^d = \begin{cases} r, & i = S \\ -r, & i = d \\ 0 & \text{otherwise} \end{cases} \quad \forall d \in R, \quad (6a)$$

$$g_{ij}^d \le f_{ij}, \forall d \in R, \forall \langle i, j \rangle \in E \quad (6b)$$

$$\sum_{\langle i,j \rangle \in E} f_{ij} \le U_i, \forall i \in V \quad (6c)$$

Output:

$$r^*; A_i^* = \sum_{\langle i,j \rangle \in E} \max_d g_{ij}^{*d} \quad (7)$$

In the previous efficiency and fairness study, no incentive issues were considered, which could cause a serious problem in reality. For example, if an Ethernet user whose uplink capacity is 2,000 kbps and a DSL user whose uplink capacity is 200 kbps both receive 500 kbps video, then why would the Ethernet user contribute more than 200 kbps? If it is assumed that all peers are strategic, then the resource of the whole system will definitely degrade and everyone will get very poor quality. On the other hand, if a DSL user joins the streaming session, with all of its uplink capacity contributed, is that really "fair" that this user can only get 200 kbps regardless of its full sharing of its resource as in "tit-for-tat" case? Hereafter, a "fair" problem is considered in the sense that every peer receives video rate at least proportional to its contribution.

It is well-known that, in common welfare theory, cost can help to improve the total utility of the whole society while maintaining a certain level of fairness. An optimal cost factor (tax rate) is usually non-linear and is complicated to determine given that costs (taxes) distort behavior. Herein a simple linear cost (taxation) method is adopted, that is $$r_d = (1-t)U_d + \frac{1}{N}\sum_i tU_i, \quad (8)$$

where t is the cost factor (taxation rate), N is the total number of peers. $(1-t)*U_d$ is defined as peer d's entitled rate, and then this rate is mapped to layers. All layers other than entitled layers are denoted as excess layers. A higher cost factor (tax rate) introduces higher system utility and a smaller cost factor (tax rate) moves closer to a tit-for-tat type of fairness. When the cost factor (tax rate) equals 0, the cost (taxation) degrades to the "tit-for-tat" or "bit-for-bit" strategy. In such a system, the system utility is obviously the lowest. Some poor peers can only receive a small portion of the video and thus obtain a rather degraded quality even though they contribute all of their uplink bandwidth. At the opposite side, when the cost factor (tax rate) is 1, all peers retrieve the same video rate regardless of their contributions. Clearly, both scenarios are extreme and undesirable.

The video quality metric PSNR is a log like curve and, thus, the marginal quality gain at low bit-rate outweighs the marginal quality gain at high bit-rate to a large extent. In other words, if a strong peer which has already received 900 kbps and the system has a spare bandwidth of 100 kbps for allocation, it would be better to allocate this 100 kbps to a weak peer which is just receiving 300 kbps. This can be done by choosing a good cost factor (tax rate). Cost (taxation) is so powerful that it can virtually impact the total system utility. In light of Eq. (8), the system operation point can be fine tuned by adjusting the cost factor (tax rate) to provide acceptable system-wide efficiency and maintain certain fairness. The trade-off between efficiency, fairness and incentive can be balanced by adjusting the cost factor (tax rate) t.

To perfectly implement the cost (taxation) scheme defined in Eq. (8), one has to again fully utilize upload bandwidth available in the system. The design space for layer scheduling is extremely tight. It is necessary for a peer to receive all its entitled layers, i.e, $r_d \geq (1-t)U_d$. The bandwidth in the common cost (taxation) pool is distributed to maximize the system-wide utility. Towards this goal the utility maximization models studied in the previous sections are segmented by imposing an additional constraint on peer receiving rate. At a given cost factor (tax rate) $0<t<1$, the utility maximization problem P2 can be reformulated as follows.

P4: Utility Maximization under Cost Factor
Variables:
$g_{ij}^{l,d}$ continuous non-negative variable
$f_{ij}^{l}$ continuous non-negative variable
$x_d^{l} \in [0, 1]$, continuous variable
Objective:

$$\max \sum_{d \in R} \sum_{l=1}^{L} x_d^l w^l \quad (9)$$

Constraints:

$$\sum_{\langle i,j \rangle \in V} g_{ij}^{l,d} - \sum_{\langle j,i \rangle \in V} g_{ji}^{l,d} = \begin{cases} x_d^l r^l, & i = S \\ -x_d^l r^l, & i = d \\ 0, & \text{otherwise} \end{cases} \quad \forall d \in R, \forall l \leq L \quad (10a)$$

$$g_{ij}^{l,d} \leq f_{ij}^{l}, \forall l \leq L, \forall d \in R, \forall \langle i, j \rangle \in E \quad (10b)$$

$$\sum_{l} \sum_{\langle i,j \rangle \in E} f_{ij}^{l} \leq U_i, \forall i \in V \quad (10c)$$

$$\sum_{l} x_d^l r^l \geq (1-t) \sum_{l} \sum_{\langle d,j \rangle \in E} f_{dj}^{l} \quad \forall d \in R \quad (10d)$$

Constraint (10d) guarantees that every peer should at least receive a rate proportional to its uploading contribution.

The lower layers also dominate the total system utility as can been inferred from the objective function. Therefore, a straightforward way to maximize the objective is to fully allocate the assigned rate to the lowest k layers such that all these layers are decodable.

To gain insights into the interplay between efficiency, fairness and incentive, numerical case studies were conducted on example systems with different topologies. For each system, P2, P3 and P4 were solved using AMPL, a optimization solver. The numerical results obtained allowed the study of the impact of streaming topology on the system performance.

First P2 and P3 were solved with a 40-receiver topology using identical settings. There is one server (uplink bandwidth of 8 Mbps) and three types of peers: 3 Ethernet peer with upload bandwidth of 4000 kbps, 12 Cable peer with bandwidth of 1000 kbps, and 25 DSL peer with upload bandwidth of 400 kbps. "Degree" is the number of connected neighbor peers. As used herein, a connection is bi-directional so the "in-degree"="out-degree"="degree". The server has a degree of 8, and only connects to Ethernet or Cable peers. The degree of peers was varied to investigate the impact of peer connectivity. The maximum peer degree is 10. Peers can operate in two different modes to select neighbors. One is hierarchical mode in which a peer prefers to connect to peers of the same type (with 70% probability). The other is random mode in which peers randomly connect to other peers, regardless of their type. The video stream is coded in 20 layers, each layer is encoded at rate of 50 kbps.

Figure 2A:
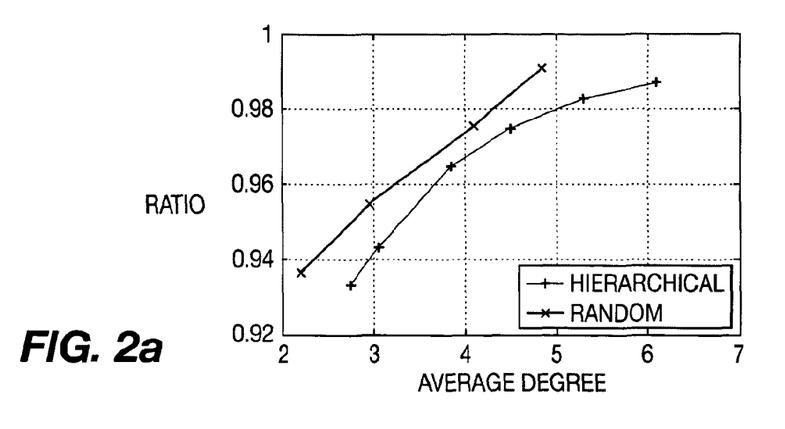
FIGS. 2(a), 2(b) and 2(c) are graphs of utility maximization and proportional fairness in hierarchical and random topologies.
Figure 2B:
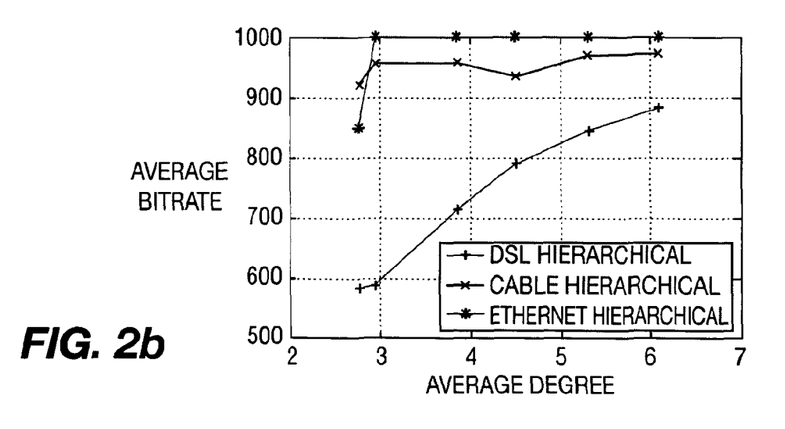
Figure 2C:
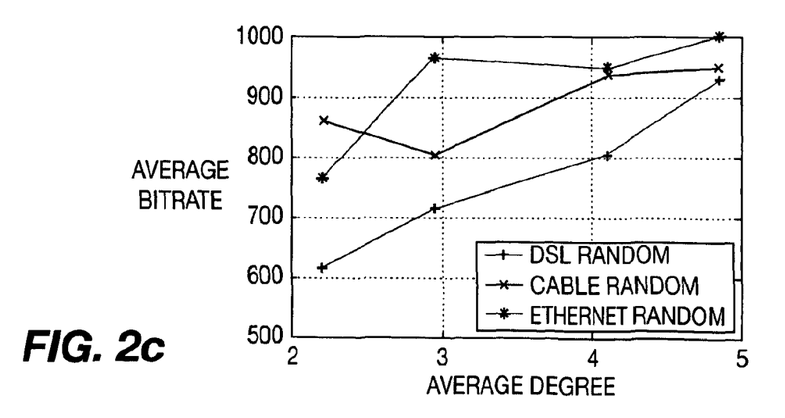

FIGS. 2(a), 2(b) and 2(c) show the solutions of P2 under different average peering degree. FIG. 2(a) compares the aggregated utility in hierarchical and random cases. The Y-axis value is obtained by dividing aggregated utility by maximum possible utility (here it is the case when every receiver gets U/N). The system utility increases as peering degree increases. The random mode gives better system wide utility. FIGS. 2(b) and (2c) compare the average receiving rate for each type of peers under the two peering modes. The hierarchical mode gives higher service differentiation.

Figure 3A:
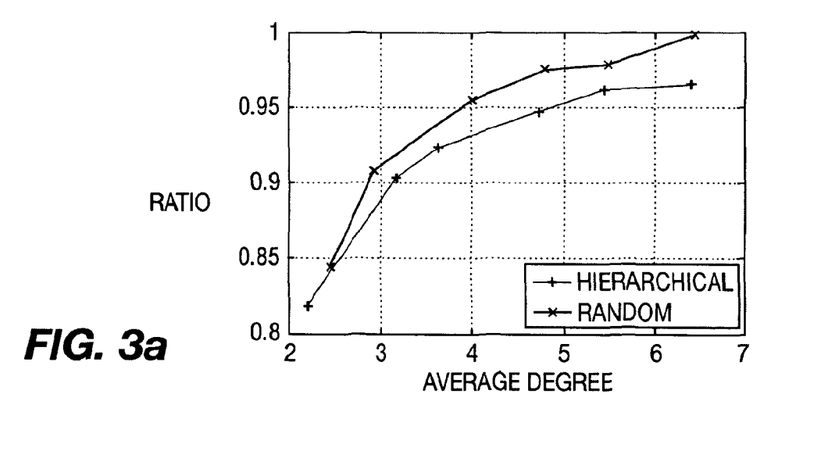
FIGS. 3(a), 3(b) and 3(c) are graphs of min-max fairness in hierarchical and random topologies.
Figure 3B:
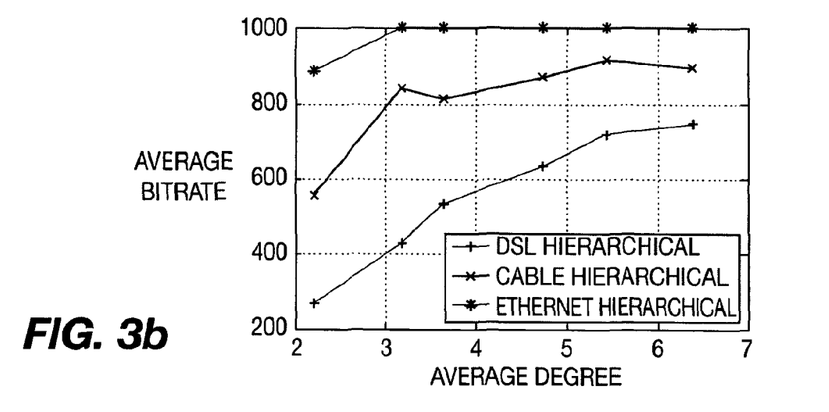
Figure 3C:
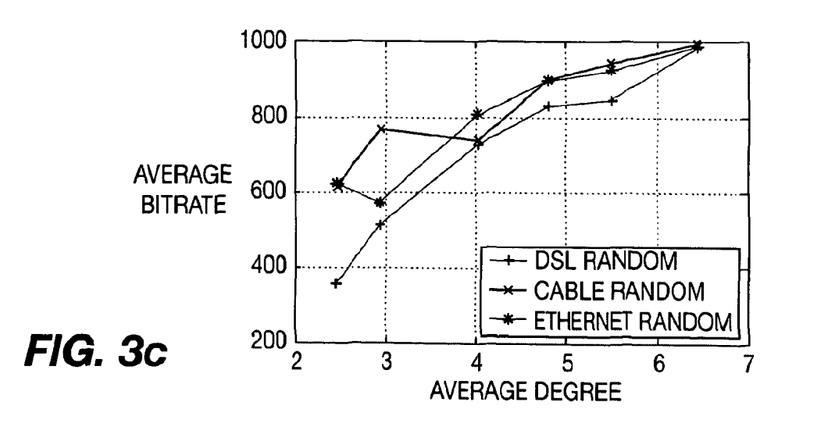

Due to the fact that P3 has fewer variables than P2, it was possible to obtain numerical solution for a network with 80 peers. In FIGS. 3(a), 3(b), and 3(c), the aggregated utility and average received rate for each type of peers in both hierarchical and random modes were compared. The system-wide utility also increases as peering degree increases. And hierarchical mode again gives higher service differentiation. The service differentiations in both modes are less than those in FIGS. 2(b) and 2(c). This is because max-min fairness put a strict priority on sending lower layers to all peers.

Figure 4A:
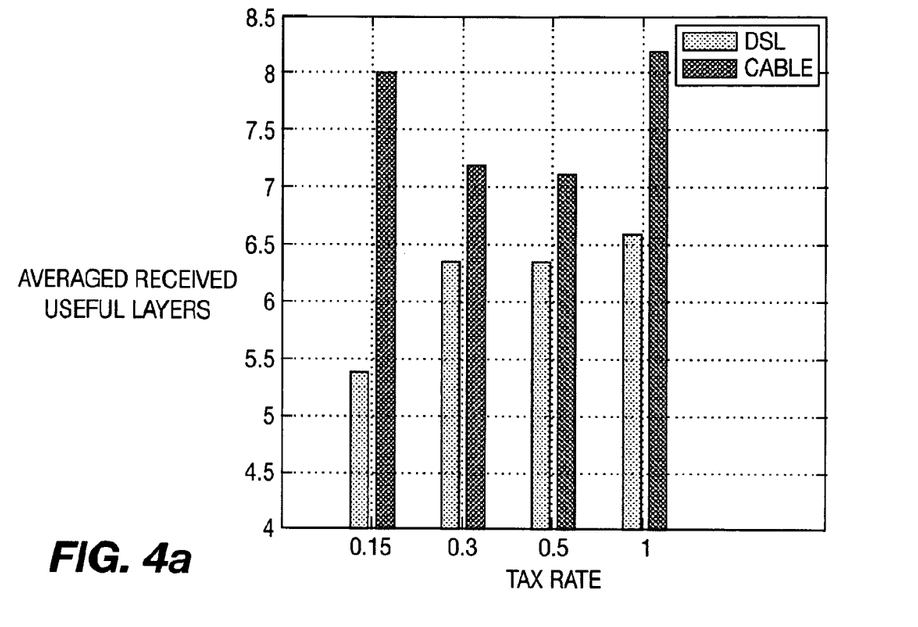
FIGS. 4(a) and 4(b) are graphs of the impact of a cost factor on fairness and system utility.
Figure 4B:
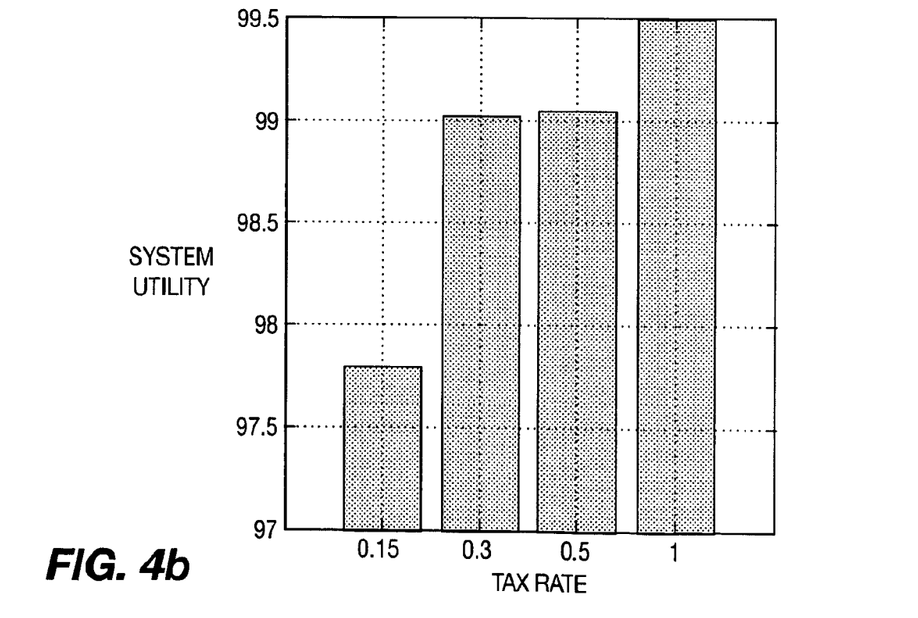

To study the impact of cost (taxation), a numerical example as shown in FIGS. 4(a) and 4(b) was studied. The system has 15 cable peers with uploading capacity of 1000 Kbps and 25 DSL peers with 400 Kbps. The cost factor (tax rate) was varied from 0.15 to 1. As can be seen from FIG. 4(a), when the cost factor (tax rate) is small, cable peers with higher upload capacity obtain more layers. Cable peers are the rightmost bars for each cost factor considered. The service differentiation provides great incentive for them to participate in P2P sharing. As the cost factor (tax rate) increases, the difference between cable peers and DSL peers decreases. On the other hand, the system wide utility increases with the cost factor (tax rate). When the cost factor (tax rate) equals 1, P4 degenerates back to P2, and the maximum utility is achieved.

The layered P2P streaming protocol is presented next. The protocol realizes the cost-based incentive mechanism as described in Eq. (8). As the cost factor t approaches one, peers are altruistically contributing upload bandwidth without asking for any return. The P2P system is geared towards evenly allocating resources to peers. Ideally, peers receive the same number of video layers, which maximizes the aggregate system utility, or common welfare. When the cost factor t is less than one, peers are guaranteed to receive a certain number of entitled layers proportional to their contribution, which serves as a contribution-aware incentive mechanism. Furthermore, network coding is not implemented in the protocol of the present invention. A carefully designed mesh-based P2P streaming system can operate close to the optimal point even without network coding. The networking coding is considered in modeling to assist the formulation of analytic model. Not using network coding simplifies the protocol design, and reduces the workload placed on peers in practice.

The protocol design of the present invention does draw several lessons learned from the numerical results. The following principles are followed in the protocol design of the present invention: (1) entitled layers have preferential treatment over excess layers; (2) for layers in the same class, lower layers have preferential treatment over higher (upper) layers; and (3) P2P overlay topology converges to hierarchical topology where peers of similar capacity are more likely to connect with each other.

Figure 5A:
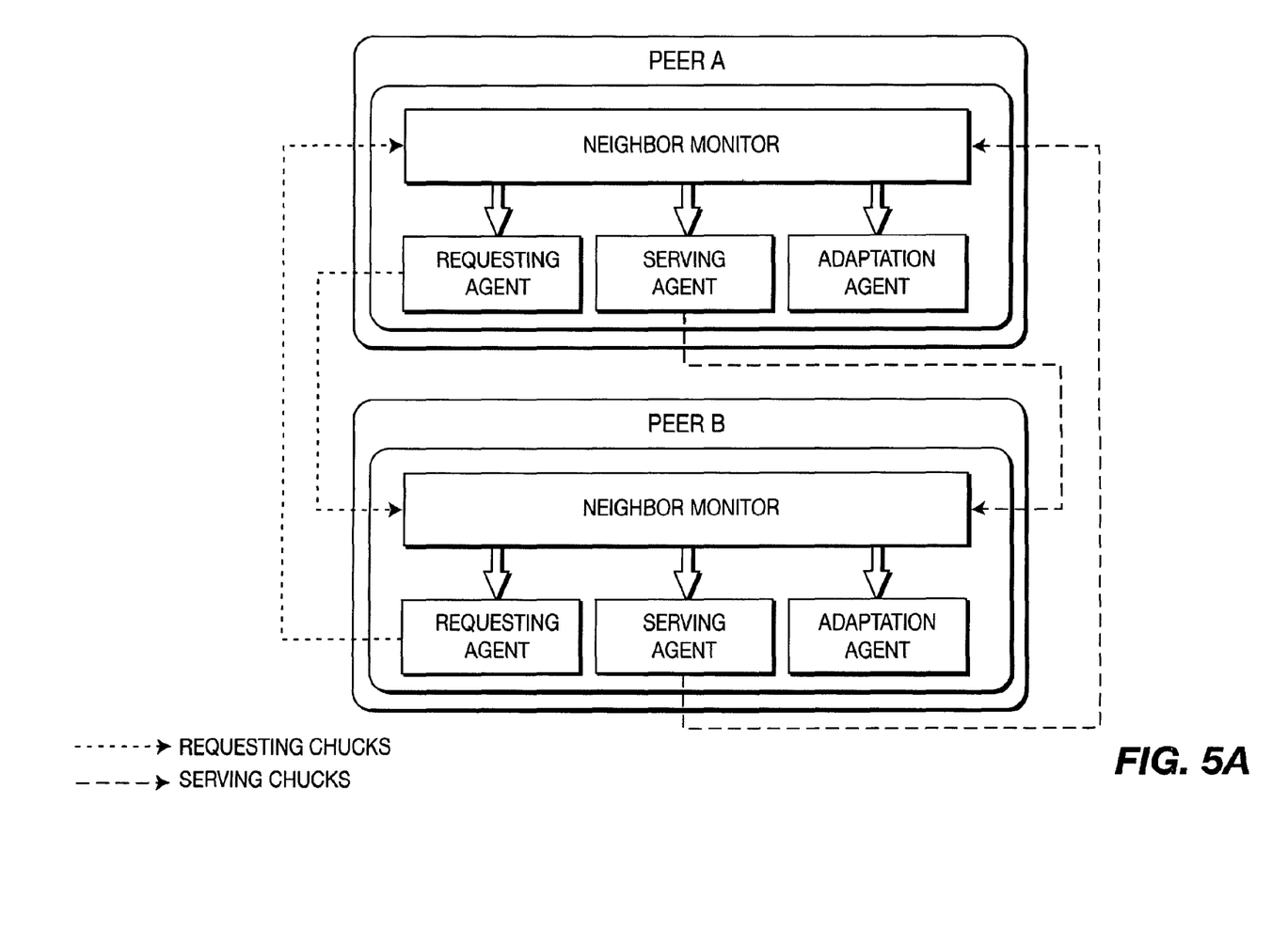
FIGS. 5A and 5B are schematic diagrams of exemplary embodiments of two peers in accordance with the principles of the present invention.
Figure 5B:
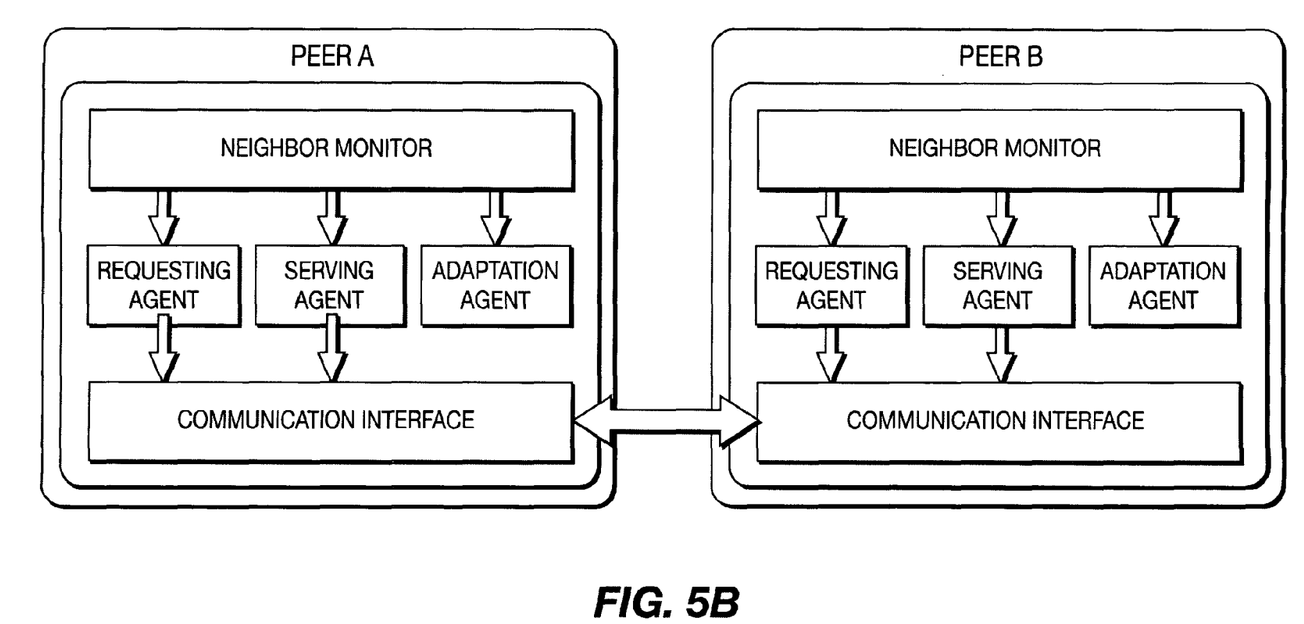

In the protocol design of the present invention, peers form an overlay over which the video is distributed. A tracker or a rendezvous point serves as the bootstrapping node for the system. Incoming peers register with the tracker, and the tracker returns a random sub-set of currently online peers to the newcomer (joining peer). After a new (joining) peer has set up connections with some peers, it starts to require and serve data from and to neighboring peers. FIGS. 5A and 5B depict the key components of a peer and how two peers communicate with each other. A peer has four key components: neighbor monitor, requesting agent, serving agent and adaptation agent. The functionality of these four components is described next. The difference between the two figures is that the data flows are semi-hidden in FIG. 5B because all communications pass through a communications interface module. Both figures will be described below.

A neighbor monitor is a module (component) that is in charge of the communication between neighbors as well as conducting statistics collection for other components. It assumes the following responsibilities:

Buffer map collection. In mesh based P2P streaming systems, peers exchange buffer-maps with each other to inform each other of availability of chunks of data (data chunks) at individual peers. In the protocol of the present invention, buffer-maps are exchanged periodically so as to allow requesting agent to issue data chunk requests to appropriate peers. The buffer maps are stored in a storage area (not shown) within the peer. The storage area can be any form of storage including but not limited to memory, discs, optical storage, flash drives, cards etc.

Contribution monitoring. A neighbor peer's serving rate is measured by this component. In addition, the serving rate to a neighbor node is also measured. The serving rate is used by the serving agent to decide how to allocate its upload bandwidth among peers, and by the adaptation agent to decide with which peers to set up peering relationships. The serving rate measurements are stored in a storage area (not shown) within the peer. The storage area can be any form of storage including but not limited to memory, discs, optical storage, flash drives, cards etc.

Request relaying: The request issued by the requesting agent will be relayed to neighboring peers through this component via the communications module (component).

Figure 6A:
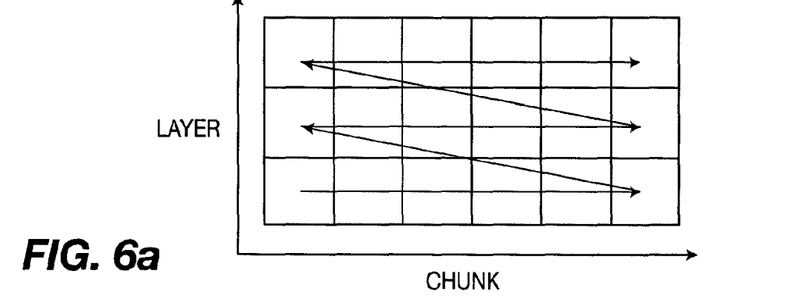
FIGS. 6(a) and 6(b) illustrate a peer requesting method.

Based on analytical models P2 and P3, the marginal gain of receiving a lower layer bit stream outweighs receiving a higher (upper) layer bit stream. Hence lower layer data chunks should be requested before higher (upper) layer chunks, as illustrated in FIG. 6($a$). This is called layered requesting (LR) strategy herein. In order to increase the data chunk diversity and improve the chance that two peers always have data chunks to exchange, it is further assumed that data chunks belonging to the entitled layers are equally important. This is reasonable because the available resource is sufficient to deliver entitled layers to all peers. There is no need to distinguish different entitled layers. This is called modified LR, or MLR, strategy herein.

Figure 6B:
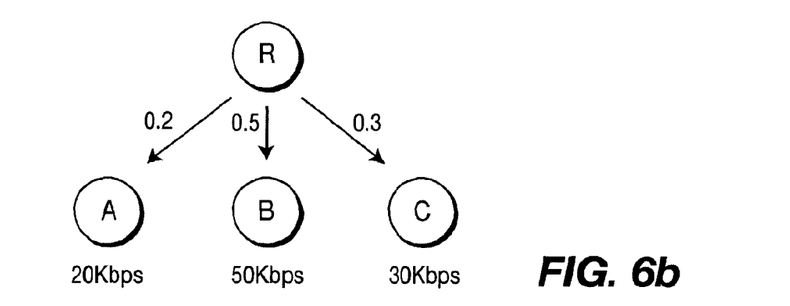

After collecting (gathering) neighbors' buffer maps, the peer selects one neighbor peer that owns a missing data chunk that it needs and requests that data chunk. The probability of choosing a specific peer is proportional to the serving rate to this peer, measured by the neighbor monitor component. FIG. 6($b$) illustrates this "biased requesting algorithm". Peer R finds three candidates, say A, B and C, having the desired data chunk. Peer R then sends a request to one candidate with the probability proportional to their downloading rate from Peer R. Therefore, A, B, and C will be selected with probability 0.2, 0.5, and 0.3, respectively.

Figure 7:
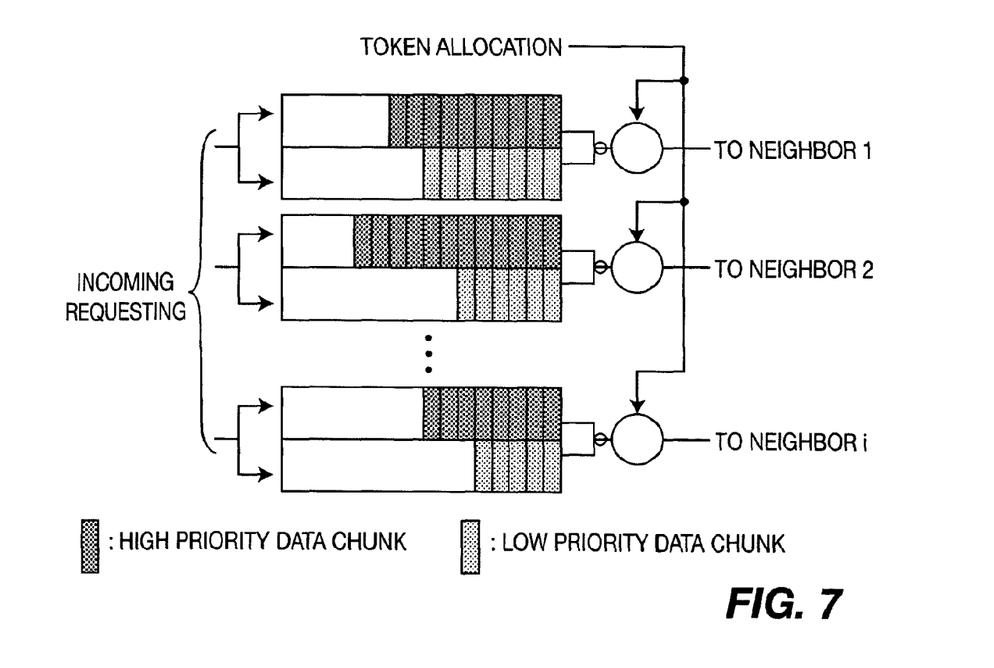
FIG. 7 illustrates the exemplary use of queues and tokens for a peer serving data chunks to its neighbors.

The serving agent is responsible for allocating upload bandwidth to different peers so that peers can receive the number of video layers governed by Eq. (8). Individual peers maintain two FIFO queues for each neighbor (see FIG. 7). One queue is called the entitled queue and the other queue is called the excess queue. The entitled queue holds data chunk requests for entitled layers. The entitled queues have a higher priority than the excess queues. The excess queue would not be served unless all entitled queues are empty. Incoming requests for data chunks are queued up for each neighbor. As shown in FIG. 7, the queue at the top is the data chunk requests for neighbor 1 for entitled data chunks. The second queue is for entitled data chunk requests for neighbor 2 etc. for all neighbors being served by this peer. The queue at the bottom of the figure is the first of a series of queues (similar to the top set of queues) for excess data chunks for the neighbors of this peer. In this exemplary embodiment there is a token scheme by which the queues are permitted to transmit data chunks out of the queues to the requesting neighbor. The token is passed from queue to queue (not necessarily in the number order of the neighbors). The entitled queues are emptied first before any excess queues receive the token. Once the entitled queues are emptied the token is passed from queue to queue among the excess data chunk queues (once again not necessarily in the number order of the neighbors).

The serving process proceeds in three stages. First the incoming requests are sorted and routed to appropriate queues. The peer then computes the amount of bandwidth that should be allocated to each peer for serving entitled queues. The allocated bandwidth is shared among neighboring peers in proportion to their contribution, i.e., the serving rate the peer receives from the neighbor peer as measured by the neighbor monitor module. The bandwidth sharing is realized through bandwidth tokens. A token represents peer's capability to serve one data chunk. Periodically, the bandwidth token is distributed to the entitled queues. The entitled queue with token can serve its queued requests. If entitled queues become empty, the leftover bandwidth serves the requests in excess queues in a round robin fashion, for example. Finally, the requests that have passed their playback deadlines are cleared out of the queues.

As discussed above, a hierarchical mesh topology is more favorable than a random topology. The adaptation agent periodically contacts the tracker to retrieve a list of candidate neighbors. It then applies the adaptation strategy as described below to ensure the overlay topology converges to the hierarchical topology. The length of adaptation period has to be chosen carefully. Ten seconds is selected in the design of the present invention.

If the number of neighbors is less than a preset configurable peer out-degree, peers from the candidate neighbor list are randomly selected to be new neighbors. If the current number of neighbors is ok, one peer is selected and replaced with a new peer from the candidate list. Such neighbor adaption allows the overlay to converge to the desired topology.

A replacement index is used to determine which peer to replace. For neighbor j, let $c_j^l$ be the number of retrieved data chunks of layer l from it, and $w_l$ be the weight associate with layer l. The replacement index for peer (neighbor) j is set to be $\Sigma_{l \in entitled-layers} c_j^l w_l$. The neighbor with the smallest replacement index is removed. The above index ensures that peers that serve more data chunks are likely to stay.

Interestingly, weight w is set to be as such that $w_l > w_k$ if l>k. Intuitively, there are less peers in the higher virtual overlay. Thus, peers who can offer high layer data chunks are more "precious" and should stay.

Returning now to FIG. 5A, which is a schematic diagram of an exemplary embodiment of two peers in accordance with the principles of the present invention. Peer A and peer B are neighbors so share data chunks. Each peer includes a neighbor monitor module (component), a requesting agent module (component), a serving agent module (component) and an adaptation agent module (component). Peer A's requesting agent requests data chunks from Peer B via Peer B's neighbor monitor module (component). Peer B's requesting agent module (component) correspondingly requests data chunks from Peer A via Peer A's neighbor monitor module (component). Peer B's serving agent module (component) serves the requested data chunks to Peer A via Peer A's neighbor monitor module (component). Peer A's serving agent module (component) correspondingly serves the requested data chunks to Peer B via Peer B's neighbor monitor module (component). Peer A's neighbor module (component) is in communication with Peer A's requesting agent module (component), serving agent module (component) and adaptation agent.

FIG. 5B is very similar to FIG. 5A except all communication between Peer A and Peer B is handled via a communication interface module. It should be clear that the present invention can be implemented in more or fewer components than described herein and that the components described herein have been segregated by function and that the functions can be further segregated or combined using more or fewer components.

Figure 8:
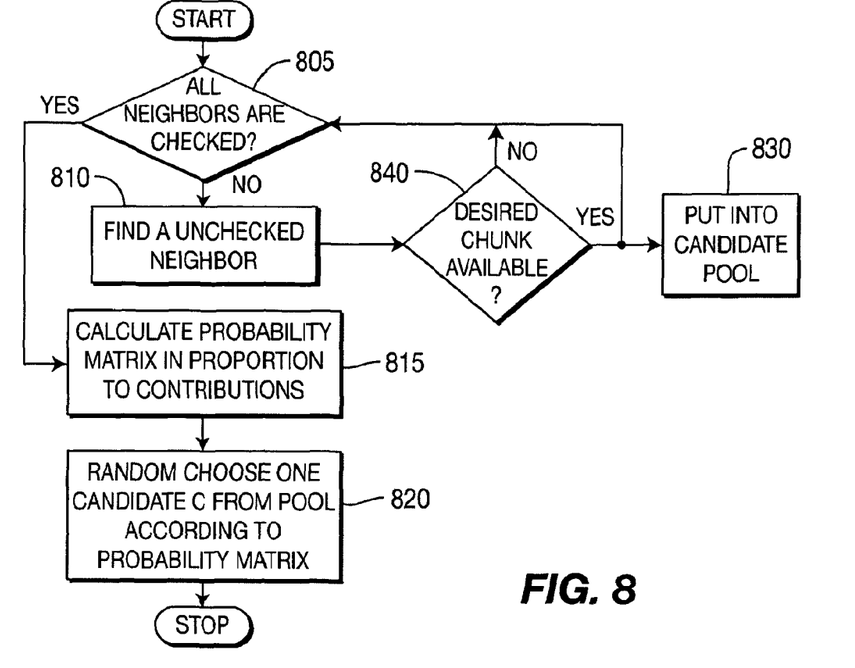
FIG. 8 is a flowchart of an exemplary embodiment of the present invention from the perspective of the requesting agent of a peer in accordance with the principles of the present invention.

FIG. 8 is a flowchart of an exemplary embodiment of the present invention from the perspective of the requesting agent of a peer in accordance with the principles of the present invention. At 805 a test is performed to determine if all neighbor peers have been checked to determine if they are on a candidate list of neighbor peers from which to retrieve any needed data chunks (content). If all neighbor peers have not been checked then at 810 an unchecked neighbor peer is located and a test is then performed at 840 to determine if the unchecked neighbor has the desired (or needed) data chunk. If the located neighbor peer does not have the desired (or needed) data chunk then processing continues at 805. If the located neighbor peer has the desired (or needed) data chunk then the located neighbor peer is added to the candidate list (pool) at 830. If all neighbor peers were checked then at 815, a probability matrix is calculated (determined) for requesting the desired data chunk based on the contributions to the resource pool of the neighbor peers that have the desired (or needed) data chunk. At 820 a candidate neighbor peer is selected from the candidate pool.

Figure 9:
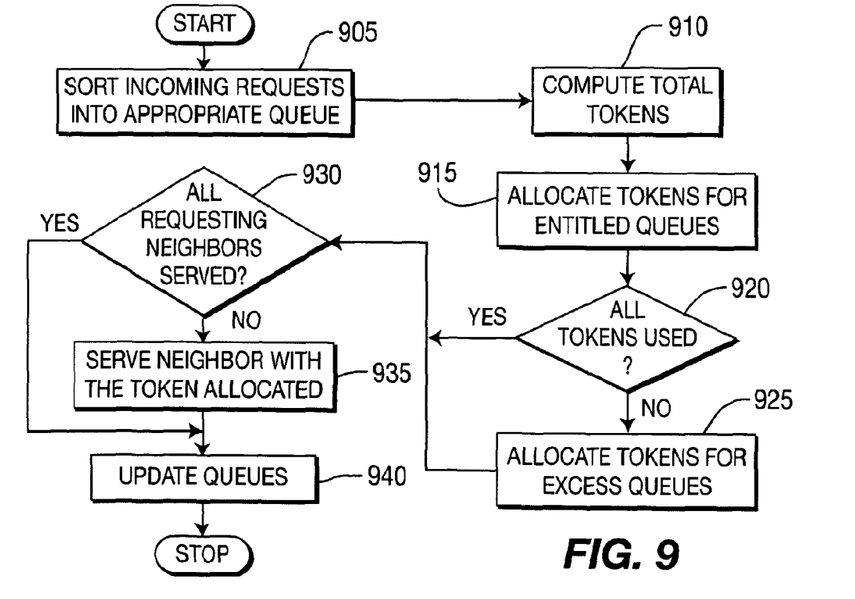
FIG. 9 is a flowchart of an exemplary embodiment of the present invention from the perspective of the serving agent of a peer in accordance with the principles of the present invention.

FIG. 9 is a flowchart of an exemplary embodiment of the present invention from the perspective of the serving agent of a peer in accordance with the principles of the present invention. At 905 any incoming requests for data chunks are sorted into the appropriate queues (based on entitlement or excess layer data). At 910 the total number of tokens (a token is the ability to send a single data chunk) is determined. At 915 the tokens are allocated to the entitled queues. A test is performed at 920 to determine of all of the tokens have been used (allocated). If all of the tokens have not been allocated (used) for the data chunks in the entitled queues then any remaining tokens are allocated to the excess queues at 925. If all of the tokens have been allocated (used) for the data chunks in the entitled queues or any remaining tokens have been allocated to the excess queues then at 930 a test is performed to determine if all neighbor peers requesting data chunks have been served. If all requests from all neighbor peers have not been served then at 935 the neighbor peer with the allocated token is served. At 940 the queues are updated including removing any data chunks on the queues which have passed their playback deadlines. If all requests from all neighbor peers have been served then processing continues at 940.

Figure 10:
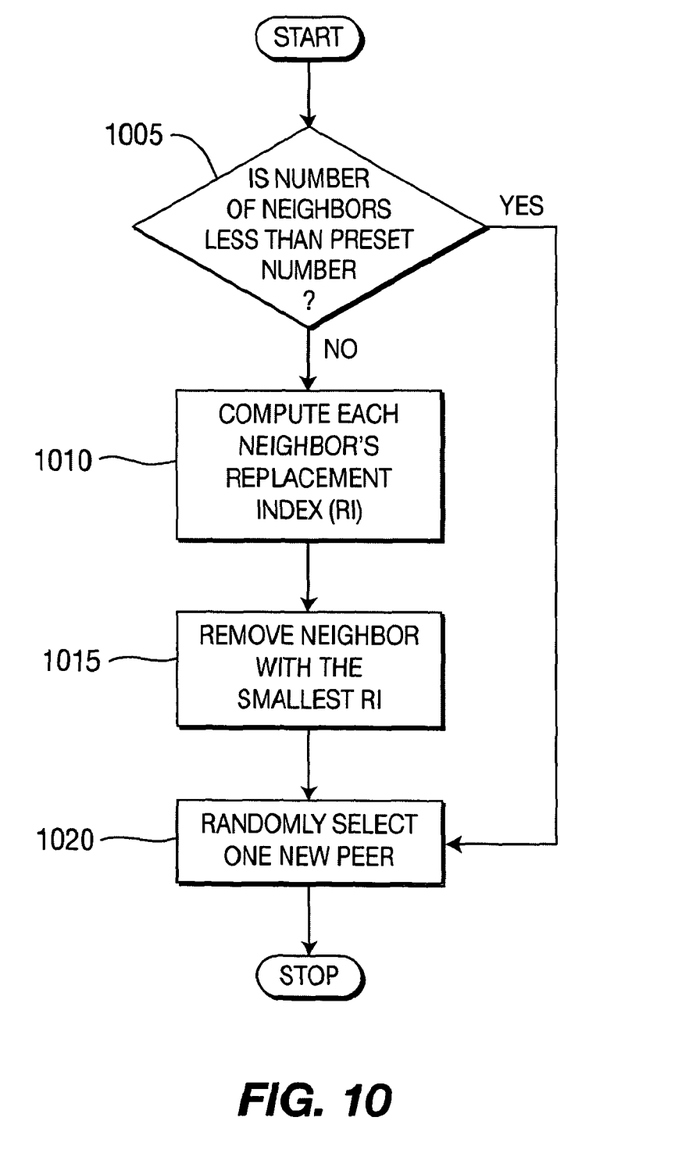
FIG. 10 is a flowchart of an exemplary embodiment of the present invention from the perspective of the adaptation agent of a peer in accordance with the principles of the present invention.

FIG. 10 is a flowchart of an exemplary embodiment of the present invention from the perspective of the adaptation agent of a peer in accordance with the principles of the present invention. At 1005 a test is performed to determine if the number of neighbor peers is less than a preset (pre-determined) number. If the number of neighbor peers is not less than a preset (pre-determined) number then at 1010 each neighbor's replacement index is calculated (computed, determined). At 1015 the neighbor peer with the smallest replacement index is removed from the candidate pool. At 1020 a new peer is randomly selected to replace the removed neighbor peer. If the number of neighbor peers is less than a preset (pre-determined) number then processing continues at 1020.

There is no flowchart for the neighbor monitor module but its functions are as described above as well as controlling the invocation and execution of the requesting agent module (component), the serving agent module (component) and the adaptation agent module (component).

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
   receiving buffer maps of neighbor peers;
   measuring serving rates from said neighbor peers;
   measuring serving rates to said neighbor peers;
   requesting a unit of data from one of said neighbor peers responsive to information in said buffer maps of said neighbor peers at a rate responsive to said serving rate from said one of said neighbor peers;
   receiving incoming requests for units of data;
   sorting said incoming requests into a plurality of queues, wherein there are an entitled queue and an excess queue for each neighbor peer, wherein a receiving rate of a neighbor peer is the sum of an entitled rate and an excess rate, and wherein the excess rate is the average of the serving rates from all peers times a cost factor t and the entitled rate is the serving rate from said neighbor peer times $(1-t)$;
   selecting one of said incoming requests to serve responsive to said serving rates to said neighbor peers corresponding to said incoming request, wherein entitled queues have priority over excess queues;
   updating said queues; and
   selecting a new neighbor peer.

2. The method according to claim 1, further comprising storing said buffer maps.

3. The method according to claim 1, further comprising storing said serving rates from said neighbor peers.

4. The method according to claim 1, further comprising storing said serving rates to said neighbor peers.

5. The method according to claim 1, wherein said requesting act further comprises:
   determining which of said neighbor peers has said unit of data responsive to said information in said buffer maps;
   updating a list of said neighbor peers from which said unit of data can be requested; and
   selecting said one of said neighbor peers from said list of said neighbor peers.

6. The method according to claim 1, wherein said second selecting act further comprises:
   determining a replacement index for each neighbor peer; and
   removing one of said neighbor peers responsive to said replacement index.

7. An apparatus operating as a peer in a peer-to-peer network, said apparatus comprising at least: one processor, one random access memory; and one input/output interface, said at least one processor being configured to:
   receive buffer maps of neighbor peers;
   measure serving rates from said neighbor peers;
   measure serving rates to said neighbor peers;
   request a unit of data from one of said neighbor peers responsive to information in said buffer maps of said neighbor peers at a rate responsive to said serving rate from said one of said neighbor peers;
   receive incoming requests for units of data;
   sort said incoming requests into a plurality of queues, wherein there are an entitled queue and an excess queue for each neighbor peer, wherein a receiving rate of a neighbor peer is the sum of an entitled rate and an excess rate, and wherein the excess rate is the average of the serving rates from all peers times a cost factor t and the entitled rate is the serving rate from said neighbor peer times $(1-t)$;
   select one of said incoming requests to serve responsive to said serving rates to said neighbor peers corresponding to said incoming request wherein entitled queues have priority over excess queues;
   update said queues; and
   select a new neighbor peer.

8. The apparatus according to claim 7, wherein said at least one processor is further configured to:
   store said buffer maps in said at least one random access memory.

9. The apparatus according to claim 7, wherein said at least one processor is further configured to:
   store said serving rates from said neighbor peers in said at least one random access memory.

10. The apparatus according to claim 7, wherein said at least one processor is further configured to:
    store said serving rates to said neighbor peers in said at least one random access memory.

11. The apparatus according to claim 7, wherein said at least one processor is configured to request by being further configured to:
    determine which of said neighbor peers has said unit of data responsive to said information in said buffer maps;
    update a list of said neighbor peers from which said unit of data can be requested; and
    select said one of said neighbor peers from said list of said neighbor peers.

12. The method according to claim 7, wherein said at least one processor is configured to select a new neighbor peer by being further configured to:
    determine a replacement index for each neighbor peer; and
    remove one of said neighbor peers responsive to said replacement index.

* * * * *